April 9, 1929.  A. K. BUSHMAN  1,708,870
MAINTAINING DISTRIBUTION OF LOAD BETWEEN LEONARD DRIVES
Filed Sept. 28, 1926
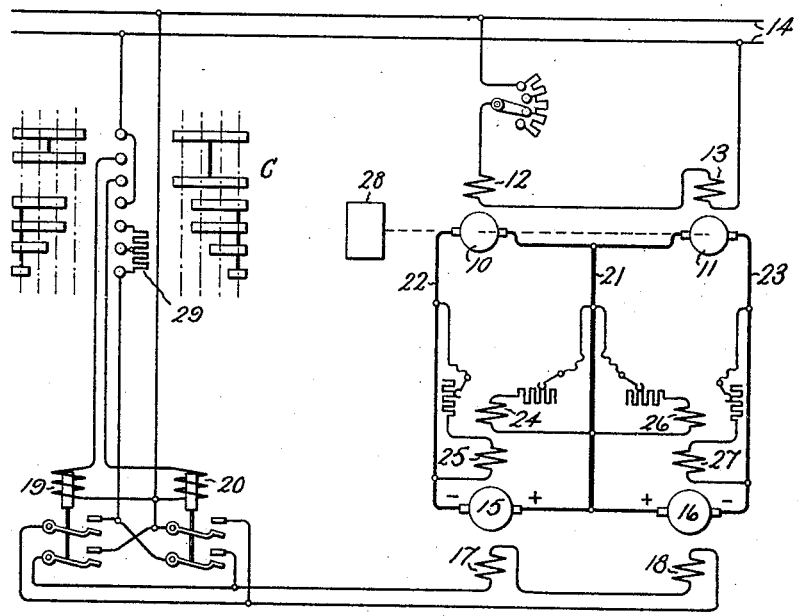
Inventor:
Andrew K. Bushman,
by
His Attorney.

Patented Apr. 9, 1929.

1,708,870

UNITED STATES PATENT OFFICE.

ANDREW K. BUSHMAN, OF OAK PARK, ILLINOIS, ASSIGNOR TO GENERAL ELECTRIC COMPANY, A CORPORATION OF NEW YORK.

MAINTAINING DISTRIBUTION OF LOAD BETWEEN LEONARD DRIVES.

Application filed September 28, 1926. Serial No. 138,155.

My invention relates to the distribution of load between Leonard drives, and in particular to the distribution of the load in such systems in which the separately excited motors of the drives are connected to a common load.

The invention has a particular application in double unit rolling mill drives wherein it is desirable to drive to load by at least two motors and to provide a generator for supplying the current for each motor armature. In such drives, if the two motor armatures are connected in series with the two generator armatures in a local circuit, because of considerations of safety to the operators and other problems which arise by reason of the relatively high voltage, provision must be made to insure that the potential across any two points of the system will not be greater than the potential of one generator armature. One way of accomplishing this is to alternate the motor armatures and the generator armatures in the local circuit. My invention provides another way of insuring that the maximum potential of the system will not be greater than the armature potential of one generator, and has certain advantageous features, as will be pointed out hereinafter, whereby there will be automatically maintained a predetermined distribution of the load between the motors.

In accordance with my invention, each motor and generator is connected in a Leonard system, the armatures of the motor and generator of each set being connected in a local circuit. A common conductor is provided as a connection between said local circuits. The excitation of the generator of each set is governed by two field windings, the energizations of which are adjusted so that the two windings normally neutralize each other. One winding is energized in accordance with the current in the local circuit in which the associated generator armature is included and the other winding is energized in accordance with the current in said common conductor. The net result of the flux set up by the two windings will be such that, upon an unbalance of the loads of the motors, the excitation of each generator will be varied in such a direction and value that the predetermined distribution of the loads will be promptly reestablished.

For a better understanding of the invention, reference is had to the accompanying drawing which shows a simplified system in accordance with the invention.

The system of control comprises two motors having armatures 10 and 11, respectively, and field windings 12 and 13, respectively, the field windings being arranged to be energized from the separate source of supply 14. The motor having armature 10 and field 12 is supplied with armature current from the generator armature 15, which is connected in a local circuit with the armature 10. The motor having armature 11 and field 13 is connected in a local circuit with the armature 16 of another generator which supplies the armature current for this particular motor. The generator field windings 17 and 18 are connected in series as shown, and are supplied with energy from the source 14 under the control of controlling means including the reversing and speed varying controller c and the directional contactors 19 and 20. The separately excited generator 15—17 and the separately excited motor 10—12 form in effect a Leonard system and this Leonard system forms one set of the machines of which the other set comprises the separately excited generator 16—18 which forms a Leonard drive with the separately excited motor 11—13. The connection 21 forms a common conductor between these two sets of Leonard systems and with the potentials of the generator armatures as indicated, the current through this common conductor will be the sum of the currents through the outside conductors 22 and 23.

The distribution of the load between the two sets of similar Leonard drives is effected in response to the relation between the current in each of the outside conductors 22 and 23 with relation to the common conductor 21. This distribution of the load is preferably effected by means of a set of field windings for each of the generators. The field winding 24 for the left-hand Leonard drive is connected in shunt relation with a portion of the conductor 21 so as to be energized responsively to the current of this conductor and the field winding 25 is connected in shunt relation with a portion of the conductor 22 so as to be energized in accordance with the current through this conductor. The energization of these two field windings is adjusted so that the fluxes set up thereby normally neutralize each other when there is the predetermined distribution of load between the two motors. When this predetermined distribution of the load is unbalanced, the field windings will be energized in a direction and at a value such that the resultant flux will be in the proper direction and of the proper value so as to vary the excitation of the generator 15—17 and promptly correct for the departure of the predetermined relation. The generator 16—18 has a similar set of field windings 26 and 27, the field winding 26 being connected so as to be energized in accordance with the current of the conductor 21 and the field winding 27 being connected so as to be energized in accordance with the current in conductor 23. The two motors are indicated as being connected to a common load 28.

As thus constructed and arranged and with the various parts in their respective positions as shown in the drawing, the operation of my invention is as follows: Assume that it is desired to operate the load 28 in one direction, the controller c will be thrown from its off position, that indicated in the drawing, to energize either the reversing conductor 19 or 20, depending upon the direction selected. Assume that the controller has been thrown to the right to its first operative position:—The field contactor 19 will be energized to close and cause the field windings 17 and 18 to be energized from the separate source of supply 14 through the speed varying resistor 29. The controller C is advanced through its various operative positions, the resistor 29 is shunted section by section and the load 28 will be accelerated by reason of the fact that the voltages of the two generators will increase. In case the opposite direction of rotation for the driven load is desired, the controller will be thrown to the left, thereby energizing the reversing field contactor 20 and causing the flow of current through the generator field windings 17 and 18 to be in the opposite direction.

The current flowing through the various field windings 24 and 25 of the one generator, and the field windings 26 and 27 of the other generator, will be adjusted so that when the load is distributed as desired between the two sets of Leonard drives, the resultant flux of the field windings 24 and 25 of the one generator will be nil and the resultant flux of the field windings 26 and 27 of the other generator will also be nil. In case there is a variation from this distribution of load, there will be a variation in the energization of these field windings and this variation will be of such a magnitude and in such a direction as to effect a reestablishment of the predetermined relation between the loads carried by the two sets of Leonard drives. Thus, if the current in the conductor 22 should increase and the current in the conductor 23 simultaneously decrease, the flux set up by the field winding 25 of the left-hand generator will increase, whereas the flux set up by the field winding 27 of the right-hand generator will decrease. The resultant flux of the field windings 24 and 25 will now be of a value which is substantially proportional to the out-of-balance load and this flux will be in such a direction as to oppose the flux set up by the field winding 17 and thereby reduce the generated potential of the left-hand generator. The field winding 26 will predominate in the right-hand Leonard drive and there will be a resultant flux of the fluxes set up by field windings 26 and 27, which will be in a direction to assist the flux set up by field winding 18. This will effect an increase of the potential of the right-hand generator and cause the motor 11—13 to take a greater share of the driven load. From the example which has been just given, those skilled in the art will readily understand the principles of the invention. While I have shown the controlling field windings 24 and 25 and 26—27 as regulating the potential of their respective generators, I would have it understood that my invention is not necessarily limited to the control of the load distribution by the generator potential, but is likewise applicable to the control of the motors directly by varying the excitation provided by the field windings 12 and 13.

What I claim as new and desire to secure by Letters Patent of the United States is:—

1. In combination in a Leonard system, two similar sets of machines, each set including a separately excited generator and a separately excited motor having their armatures in a closed local circuit each part of which carries at least full armature current, and excitation controlling means for a machine of each set for automatically maintaining a predetermined relation between the armature currents of said motors, the said means being connected with the system to respond differentially to the direction and the value of the current in the local circuit of the other set and the armature current of the motor of the set.

2. In combination in a Leonard system, two similar sets of machines, each set including a separately excited generator and a separately excited motor having their armatures in a closed local circuit each part of which carries at least full armature current, and excitation controlling means for each generator energized differentially in response to the current in the local circuit of the other set and the current through the generator armature for automatically maintaining a predetermined distribution of load between said motors.

3. In combination in a Leonard system, two similar sets of machines, each set including a separately excited generator and a separately excited motor having their armatures in a local circuit, the said motors being connected to a common load, a field winding for each generator energized responsively to the sum of the currents in said local circuits, and a second field winding for each of said generators energized responsively to the current through the generator armature, said second field windings being differentially wound with respect to said first field windings for automatically maintaining a predetermined distribution of load between said motors.

4. In combination in a Leonard system, a set of machines comprising a separately excited generator and a separately excited motor having their armatures included in a local circuit, a second similar set of machines, the said motors being connected to a common load, the local circuits of said sets having a common conductor which carries the sum of the current in the local circuits, a field winding of each generator energized responsively to the current in said conductor, and a field winding for each generator energized responsively to the armature current of the associated generator and differentially wound with respect to the first said field winding to maintain a predetermined distribution of the load between said motors.

5. In combination in a Leonard system, two similar sets of machines, each set including a separately excited generator and a separately excited motor having their armatures in a local circuit, the said local circuits having a common conductor and the generator armature terminals connected to said conductor having the same polarity, and means for maintaining a predetermined distribution of the load between said generators, the said means including a field winding for each generator connected in shunt with a portion of said conductor, and another field winding for each generator differentially wound with respect to said first winding and connected in shunt with a portion of said local circuit which carries only the armature current of said generator.

In witness whereof, I have hereunto set my hand this 25th day of September, 1926.

ANDREW K. BUSHMAN.